United States Patent
Le Garrec

(10) Patent No.: US 6,876,741 B2
(45) Date of Patent: Apr. 5, 2005

(54) DEVICE FOR DETECTING TELEPHONE LINE SEIZURE

(75) Inventor: Thomas Le Garrec, Saint Melaine (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 10/480,217

(22) PCT Filed: Jun. 5, 2002

(86) PCT No.: PCT/EP02/06160

§ 371 (c)(1),
(2), (4) Date: Dec. 10, 2003

(87) PCT Pub. No.: WO02/103989

PCT Pub. Date: Dec. 27, 2002

(65) Prior Publication Data

US 2004/0151301 A1 Aug. 5, 2004

(30) Foreign Application Priority Data

Jun. 14, 2001 (FR) ............................. 01 08083

(51) Int. Cl.⁷ .............................................. H04M 1/00
(52) U.S. Cl. ...................................... 379/377; 379/379
(58) Field of Search .................... 379/377, 379, 379/106.08

(56) References Cited

U.S. PATENT DOCUMENTS

| | | | |
|---|---|---|---|
| 5,291,545 A | 3/1994 | Stahl | 379/98 |
| 6,134,321 A | 10/2000 | Pitsch | 379/399 |
| 6,393,123 B1 * | 5/2002 | Staver et al. | 379/377 |
| 6,470,083 B1 * | 10/2002 | Hemminger et al. | 379/377 |

FOREIGN PATENT DOCUMENTS

DE 37 12324 8/1988 .......... H04M/11/04

* cited by examiner

*Primary Examiner*—Forester W. Isen
*Assistant Examiner*—Jefferey F. Harold
(74) *Attorney, Agent, or Firm*—Joseph S. Tripoli; Harvey D. Fried; Joseph J. Kolodka

(57) ABSTRACT

The device for detecting telephone line seizure performs a measurement of voltage of the telephone line across a first and a second optocoupler connected in series to the telephone line and arranged head-to-tail. The first optocoupler makes it possible to discharge a capacitor connected to the telephone line, the second optocoupler converts the discharge current into an image current in a measurement circuit. This device comprises means ensuring negative feedback of the second optocoupler to the first optocoupler. With this layout, the influence of the transfer coefficients of the optocouplers on the voltage measurement is decreased, so as to increase the accuracy of measurement.

3 Claims, 1 Drawing Sheet

DEVICE FOR DETECTING TELEPHONE LINE SEIZURE

This application claims the benefit under 35 U.S.C. § 365 of International Application PCT/EP02/06160 filed Jun. 5, 2002, which claims the benefit of French Patent Application No. 01/08083 filed Jun. 14, 2001.

BACKGROUND OF THE INVENTION

1. Field of the Invention

The invention relates to a device for detecting telephone line seizure, performing a measurement of voltage of the said telephone line across a first and a second optocoupler connected in series to the said telephone line and arranged head-to-tail, the first optocoupler making it possible to discharge a capacitor connected to the telephone line, the second optocoupler converting the discharge current into an image current in a measurement circuit.

2. Prior Art

The invention is more especially intended for a telephone apparatus or terminal capable of making a telephone call in an autonomous manner. The invention can for example be integrated into a cable-television or satellite-television network subscription module, such a module being installed at the subscriber's premises so as to be linked to the television receiver, to the cable or satellite network and to a telephone line. With such a module, the subscriber can in particular order a film of his choice by selecting it from a menu made available by a particular channel of the cable network. The module comprises a modem which despatches a corresponding request through the telephone line so that the cable network sends the chosen film to the subscriber's module. In the case where the telephone line is engaged by another user who is communicating with an apparatus connected in parallel to the line, the module must necessarily be capable of detecting that the line is engaged so as to defer the despatching of its request in order not to disturb the communication in progress. Similarly, when such an apparatus makes a call, it must also be capable of releasing the line if it detects that another apparatus is attempting a call. Conventionally, the detection of telephone line seizure consists in measuring the line voltage, this voltage being equal to around 50 volts if the line is free, and a lower value if it is engaged. When the line is engaged, if another apparatus attempts a call, this will also result in a drop in the line voltage.

It is known in particular to perform such a measurement with two optocouplers arranged head-to-tail and in series with the terminals of the telephone line. In this device, the first optocoupler is driven by a pulse generator so as to trigger discharges of a capacitor which is also connected to the line, in parallel with the optocouplers. Each discharge of the capacitor produces a discharge current which is converted by the second optocoupler into an image current reflecting the discharge current in a measurement circuit. The discharging of the capacitor being carried out at constant current, the discharge time is proportional to the voltage of the line divided by the value of the discharge current, and this discharge time is evaluated in the measurement circuit so as to ascertain the voltage of the line. The use of optocouplers makes it possible to isolate the line from the measurement circuit so as to protect the latter from any overvoltages which may be transmitted by the line. In such a device, the first optocoupler controls the value of the discharge current of the capacitor, this discharge current being proportional to the transfer coefficient of the first optocoupler.

The problem of such a layout is that the dispersion in the transfer coefficient of the first optocoupler generates dispersion in the measurement. One way of solving this defect could consist in selecting optocouplers having a well-defined transfer coefficient, this generating a significant extra manufacturing cost.

SUMMARY OF THE INVENTION

The invention remedies the drawbacks occasioned by the dispersion in the transfer coefficients of the optocouplers.

Accordingly, the invention is a device for detecting telephone line seizure, through a measurement of voltage of the said telephone line across a first and a second optocoupler connected in series to the said telephone line and arranged head-to-tail, the first optocoupler making it possible to discharge a capacitor connected to the telephone line, the second optocoupler converting the discharge current into an image current in a measurement circuit. Said device comprises means ensuring negative feedback of the second optocoupler to the first optocoupler.

With this construction, the influence of the transfer coefficients of the optocouplers on the voltage measurement is reduced, so as to increase the accuracy of measurement of the device.

According to a preferred embodiment of the invention, the first optocoupler has its diode which is linked to an earth of the device across a resistor, and the second optocoupler has its transistor which is also linked to the earth of the device across the resistor so as to ensure the negative feedback. With this layout, negative feedback is obtained at lower cost.

BRIEF DESCRIPTION OF THE DRAWINGS

The invention will now be described in greater detail, and with reference to the appended drawings which illustrate an embodiment thereof by way of non-limiting example.

DETAILED DESCRIPTION

Figure 1:
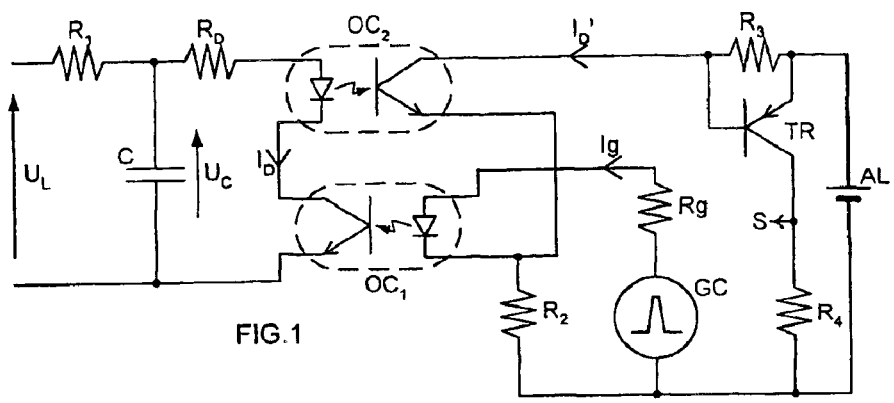
FIG. 1 is a diagrammatic representation of the device according to the invention.

As may be seen in FIG. 1, the device according to the invention comprises a capacitor C which is connected to the terminals of a telephone line having a voltage $U_L$, and two optocouplers $OC_1$, $OC_2$ arranged head-to-tail which are connected in series to the terminals of the telephone line. These optocouplers form an electrical protection interface between the telephone line and a circuit for measuring the line voltage. In this figure, the telephone line comprises a resistor $R_1$ which is a load resistor, and a discharge resistor $R_D$ which is linked to the line and to the capacitor so as to be traversed by a discharge current $I_D$ of the capacitor C. The resistor $R_1$ is a high impedance so that the current for charging the capacitor C across the resistor $R_1$ is very low so as not to disturb the line. The discharge resistor $R_D$ is a low value impedance which serves to reduce the collector voltage of the transistor of the first optocoupler $OC_1$ if necessary. The resistor $R_D$ may be dispensed with in certain cases.

The first optocoupler $OC_1$ has its transistor connected to a conductor of the telephone line and to the anode of the diode of the second optocoupler $OC_2$, this diode having its cathode connected to the line across the resistors $R_1$ and $R_D$ so as to form the so-called head-to-tail arrangement. The diode of the first optocoupler has its anode supplied with a current Ig provided by a pulse generator GC across a resistor Rg. The generator GC is connected between the resistor Rg and the earth M of the device. The diode of the first optocoupler $OC_1$ has its cathode connected to the earth M of the device across a resistor $R_2$, so that the pulse generator GC turns on the transistor of the first optocoupler so as to trigger discharges at constant current $I_D$ of the capacitor C. The second optocoupler $OC_2$ has its transistor which receives a current provided by a power supply AL. It is connected to the positive terminal of this supply by way of a resistor $R_3$, and to the earth M across the resistor $R_2$. When the capacitor C discharges, it generates the current $I_D$ which passes through the two optocouplers so as to be converted into an image current $I_D'$ in the measurement circuit which comprises in particular the resistor $R_3$ and the transistor of the second optocoupler.

Discharges are triggered by the generator GC whenever one wishes to carry out a line voltage measurement. The pulses each have a duration greater than the discharge time of the capacitor C at a voltage of 50 volts, the pulse duration being equal for example to 10 ms. The duration T of the discharges is measured at the level of the image current $I_D'$ which passes through the resistor $R_3$, and this duration is directly proportional to the voltage of the line since $C.U_L = I*T$. In the exemplary embodiment proposed, the resistor $R_3$ has its two terminals connected respectively to the collector and to the gate of a transistor TR whose emitter is linked to the earth M by way of a resistor $R_4$. Thus, a non zero current passes through the resistor $R_4$ when the capacitor C discharges, and this current vanishes at the end of discharge. Measurement of the discharge time is carried out at a point S situated between the emitter of TR and the resistor $R_4$ by an ancillary circuit (not represented).

The device is, as the case may be, associated or integrated with an apparatus or piece of equipment capable of performing a telephone line seizure.

In the prior art, the second optocoupler has the cathode of its diode which is linked directly to the earth M of the circuit, as represented by the chain-dashed line in FIG. 1. The discharge current $I_D$ is then directly proportional to the transfer coefficient $K_1$ of the first optocoupler: $I_D = ((V_C - V_D)/R_2)*K_1$ where $V_D$ and $V_C$ respectively designate the voltage drop at the terminals of the diode of the first optocoupler $OC_1$ and the voltage of the pulse generator GC. With this layout, the measurement dispersion is proportional to the dispersion of $K_1$. Stated otherwise, for a transfer coefficient varying between 0.5 and 1.5, the measurement also varies between 0.5 and 1.5 in a prior art circuit.

In the device according to the invention, the circuit comprises a loop for negative feedback from the second optocoupler $OC_2$ to the first optocoupler $OC_1$ so as to remedy this drawback. More particularly, the second optocoupler $OC_2$ has the emitter of its transistor which is connected to the diode of the first optocoupler at the level of the resistor $R_2$ so as to form the negative feedback. The resistor $R_2$ is therefore traversed by the image current $I_D'$ and by the current Ig provided by the pulse generator GC. It follows that the discharge current may be written: $I_D = ((V_C - V_D)/R_2)*(K_1/(1+K_1.K_2))$ where $V_D$ and $V_C$ respectively designate the voltage drop of the diode of the first optocoupler $OC_1$ and the voltage of the generator GC.

Figure 2:
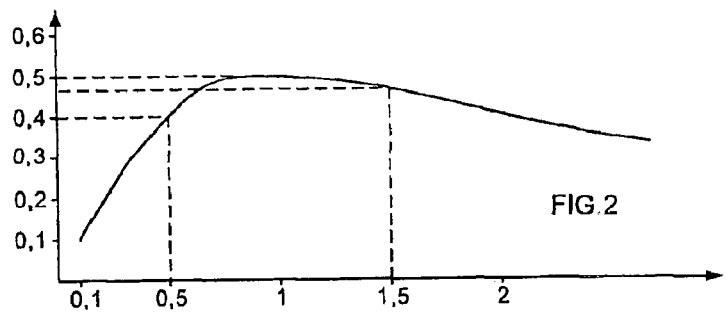
FIG. 2 is a curve giving the influence of the transfer coefficient on the accuracy of measurement.

FIG. 2 represents the curve giving, for a given voltage $U_L$, the measurement value as a function of the transfer coefficient for the case where $K_1 = K_2$ in the device according to the invention. In view of the expression for the discharge current in the device according to the invention, this curve is that of the function $y = x/(1+x^2)$. Consequently, for a transfer coefficient varying between 0.5 and 1.5, the measurement varies between 0.4 and 0.5 with the device according to the invention, if $K_1 = K_2$. More generally, regardless of the value of the transfer coefficient, the measurement factor necessarily lies between 0 and 0.5, whereas in the prior art, the measurement factor is not bounded above since the corresponding curve is that of the straight line $y = x$.

More particularly, if the two optocouplers of one and the same device are not matched as a pair, their respective transfer coefficients are not necessarily identical. Within the framework of mass production, the probability of getting very different values for the transfer coefficients is low enough for the device to retain its interest.

Figure 3:
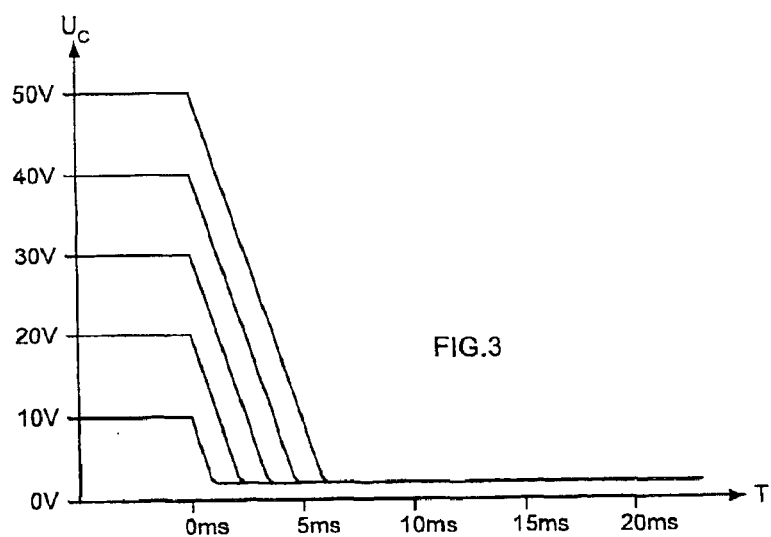
FIG. 3 is a graphical representation of the discharging of the capacitor at constant current.

Represented in FIG. 3 is the voltage across the terminals of the capacitor C during various discharges, for initial voltages of the line varying between 50 volts and 10 volts. This graph illustrates the discharge time, for a device according to the invention, in which the characteristics of the components are as follows:

$R_1 = 2200$ k, $R_2 = 2$ k, $R_3 = 2$ k, $R_4 = 47$ k, Rg = 10 k, C = 100 nf, AL = 5 V, and $K_1 = K_2 = 100\%$, which give rise to currents $I_D$, $I_D'$ and Ig of around 1 mA.

As may be seen in this figure, the discharge times T obtained vary linearly between 5 ms for 50 volts and 1.25 ms at 10 volts. The device is therefore suitable for performing for example a measurement every second, this being sufficient for line monitoring. More particularly the discharge of the capacitor C is linear and follows the same slope for all the initial voltages of the line. The device according to the invention is therefore independent of the transfer coefficients if the two optocouplers are matched as a pair, this being the case since they generally originate from one and the same silicon wafer.

What is claimed is:

1. Device for detecting telephone line seizure, through a measurement of voltage of the said telephone line across a first and a second optocoupler connected in series to the said telephone line and arranged head-to-tail, the first optocoupler making it possible to discharge a capacitor connected to the telephone line, the second optocoupler converting the discharge current into an image current in a measurement circuit, wherein said device comprises means ensuring negative feedback of the second optocoupler to the first optocoupler.

2. Device according to claim 1, in which in the measurement circuit, the first optocoupler has its diode which is linked by its cathode to an earth of the device across a resistor, and in which the second optocoupler has its transistor which is linked by its emitter to the earth across the said resistor.

3. Apparatus comprising means for performing a telephone line seizure, and a detection device for detecting telephone line seizure, through a measurement of voltage of the said telephone line across a first and a second optocoupler connected in series to the said telephone line and arranged head-to-tail, the first optocoupler making it possible to discharge a capacitor connected to the telephone line, the second optocoupler converting the discharge current into an image current in a measurement circuit, wherein said device comprises means ensuring negative feedback of the second optocoupler to the first optocoupler.

* * * * *